(12) United States Patent
Yu et al.

(10) Patent No.: US 8,746,947 B2
(45) Date of Patent: Jun. 10, 2014

(54) BACKLIGHT MODULE, LCD DEVICE AND LIGHT SOURCE OF BACKLIGHT MODULE

(75) Inventors: Yajun Yu, Shenzhen (CN); Quan Li, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 99 days.

(21) Appl. No.: 13/504,142

(22) PCT Filed: Apr. 5, 2012

(86) PCT No.: PCT/CN2012/073507
§ 371 (c)(1),
(2), (4) Date: Jun. 18, 2012

(87) PCT Pub. No.: WO2013/143156
PCT Pub. Date: Oct. 3, 2013

(65) Prior Publication Data
US 2013/0258713 A1    Oct. 3, 2013

(30) Foreign Application Priority Data

Mar. 27, 2012 (CN) .......................... 2012 1 0082739

(51) Int. Cl.
*F21V 8/00* (2006.01)
*G02F 1/13357* (2006.01)
*G09F 13/18* (2006.01)

(52) U.S. Cl.
USPC ........... 362/612; 362/630; 362/633; 362/97.3

(58) Field of Classification Search
USPC ............... 362/97.1–97.4, 606–613, 294, 615; 349/61–71
See application file for complete search history.

(56) References Cited

U.S. PATENT DOCUMENTS

| 8,267,565 | B2 * | 9/2012 | Pan ............................... 362/612 |
| 2006/0097385 | A1 * | 5/2006 | Negley .......................... 257/722 |
| 2006/0279962 | A1 * | 12/2006 | Loh ............................... 362/97 |
| 2010/0002418 | A1 | 1/2010 | Lin |
| 2010/0007817 | A1 * | 1/2010 | Kim ............................... 349/60 |
| 2012/0025257 | A1 | 2/2012 | Wu et al. |
| 2013/0250183 | A1 * | 9/2013 | Ishimoto ....................... 362/611 |

FOREIGN PATENT DOCUMENTS

| CN | 101078835 A | 11/2007 |
| CN | 101169552 A | 4/2008 |
| CN | 101634777 A | 1/2010 |
| CN | 201672376 U | 12/2010 |

(Continued)

OTHER PUBLICATIONS

Yang Yingjia, the first office action, May 2013, CN.

(Continued)

*Primary Examiner* — Mariceli Santiago
(74) *Attorney, Agent, or Firm* — IPro, Inc.; Na Xu

(57) ABSTRACT

The invention provides a backlight module, an LCD device and a light source of the backlight module. The backlight module includes an LED chip, and a heat sink; the LED chip and a circuit thereof are directly arranged on the heat sink. In the invention, because the LED chip of the backlight module and the circuit thereof are directly arranged on the heat sink, heat emitted by the LED chip can be conducted out through the heat sink with good heat dissipation effect; thus, the inside temperature of the backlight module is reduced, and the heat dissipation efficiency of the backlight module is increased.

17 Claims, 5 Drawing Sheets

(56) References Cited

FOREIGN PATENT DOCUMENTS

| | | | |
|---|---|---|---|
| CN | 101943351 A | | 1/2011 |
| CN | 102003661 A | | 4/2011 |
| CN | 102346332 A | | 2/2012 |
| CN | 102354725 A | | 2/2012 |
| JP | 2001160312 A | * | 6/2001 |
| JP | 2011-253769 A | | 12/2011 |
| KR | 100764447 B1 | * | 9/2007 |
| WO | WO 2009148449 A1 | * | 12/2009 |
| WO | WO2011162016 A1 | | 12/2011 |

OTHER PUBLICATIONS

Xiao Xia, the International Searching Authority written comments, Jan. 2013, CN.

* cited by examiner

BACKLIGHT MODULE, LCD DEVICE AND LIGHT SOURCE OF BACKLIGHT MODULE

TECHNICAL FIELD

The invention relates to the field of liquid crystal displays (LCDs), and more particularly to a backlight module, an LCD device and a light source of the backlight module.

BACKGROUND

As a key component of an LCD device, a backlight module is mainly used for providing sufficient brightness and uniformly distributed light sources, to enable an LCD device to normally display images FIG. 1 shows a backlight module of an LCD device, including a backplane 100, a lightbar 140 fixed on the side wall of the backplane 100, a reflecting plate 110 arranged on the backplane 100, a light guide panel (LGP) 120 which is arranged on the reflecting plate 110 and opposite to the lightbar 140, a rubber frame 150 and an outer frame 200 which are arranged outside the backplane 100 and used for pressing the LGP 120; optical film(s) 130 is arranged on the light emitting surface of the LGP 120, and an LCD panel 300 is fixed above the backlight module by components including the rubber frame 150, the outer frame 200 and the like. Because the lightbar 140 of such structure is fixed on the backplane 100, in an inner cavity of the backlight module, heat emitted by the lightbar 140 is conducted to the surface of the backplane 100 through the side wall of the backplane 100 and then dissipated through air convection. However, because the heat conduction path is long, the heat is accumulated in the inner cavity of the backlight module for a long time, resulting in certain damage to the components in the backlight module; thus, the components such as the reflecting plate 110, the LGP 120 and the like in the backlight module operate in an area of accumulated heat for a long time and then change, affecting the stability and the service life of the components in the backlight module, and the stability of the LCD panel, and then reducing the display effect of the LCD device.

In addition, as shown in FIG. 2, the lightbar 140 mainly includes an LED 141 and a printed circuit board (PCB) 142; the LED 141 is a light source and generates a lot of heat when emitting light. The heat is conducted to the backplane 100 through the PCB 142 and to an aluminum extrusion (not shown in the Figure) arranged on the back side of the PCB as well, and then conducted out through the backplane 100. The PCB is not a good heat conductor because of the material reason thereof. Thus, most of heat is accumulated on the lightbar 140 for a long time, and the inside temperature of the cavity of the lightbar 140 is high for a long time, thereby affecting the safety and the service life of the components in the backlight module and the LED, and then reducing the optical quality of the backlight module if the components in the backlight module are affected.

As shown in FIG. 3, U.S. Pat. Pub. No. US2010/0002418A1 discloses another backlight module, including a backplane 100, a heat conducting plate 190 closely attached to the backplane 100, a lightbar 140 fixed on the side wall of the backplane 100, an LGP 120 arranged opposite to the LED 141 on the lightbar 140, a reflecting plate 110 arranged below the LGP 120, and an outer frame 200 arranged outside the backplane 100; optical film(s) 130 is arranged on the light emitting surface of the LGP 120, and an LCD panel 300 is arranged above the backlight module. In addition, the backlight module further includes a support piece 170 which is used for supporting the reflecting plate 110 and the LGP 120 thereon; thus, an air cavity 180 is formed between the heat conducting plate 190 and the reflecting plate 110, to play a role of heat insulation. The lightbar of the backlight module of such structure includes a PCB and an LED 141; the PCB is arranged on the backplane 100 or the aluminum extrusion. However, although the influence of the heat on the reflecting plate 110, etc. is avoided during heat transfer as far as possible in the arranging mode, the heat conduction path remains that: heat is conducted to the backplane 100 through the heat conducting plate 190, and is dissipated through the contact between the backplane 100 and air. Because the heat conduction path is still long, heat is accumulated inside the backlight module for a long time, thereby affecting the service life and safety of the components in the backlight module, and the service life of the LCD panel of the LCD device.

SUMMARY

In view of the above-described problems, the aim of the invention is to provide a backlight module, an LCD device and a light source of the backlight module with good heat dissipation effect.

The aim of the invention is achieved by the following technical scheme:

A backlight module comprises LED chip(s) and heat sink(s); the LED chip and a circuit thereof are directly arranged on the heat sink.

Preferably, the heat sink is made of metal material, the surface of the heat sink is coated with an insulating layer, and the circuit is arranged on the insulating layer. Metal material has preferable heat dissipation effect.

Preferably, the insulating layer is made of material with good heat conductivity, thereby preventing the insulating layer from reducing the heat dissipation performance of the heat sink.

Preferably, the LED chip is directly welded on the heat sink, and the LED chip is not externally provided with a package. For the ordinary backlight module, such as for the backlight module of which a lightbar is arranged on an aluminum extrusion, the aluminum extrusion can be replaced by the heat sink, the thickness of the PCB can be reduced by the lightbar, and the package thickness can be reduced because the LED chip is directly welded on the heat sink without arranging package, being beneficial to the addition of the A value of the backlight module.

Preferably, the heat sink is radiating fins; the LED chip and the circuit thereof are arranged on a substrate of the radiating fins. The radiating fins have excellent heat dissipation effect.

Preferably, the backlight module comprises a backplane; the side wall of the backplane is provided with insert hole(s), and the radiating fins is inserted in the insert hole. Thus, the distance between the LED chip and the inner edge of the rubber frame is added, and then the A value is added.

Preferably, the backlight module comprises a backplane; the side wall of the backplane is provided with pit(s) extending to the outside of the backlight module relative to the light incident surface of the LGP, and the heat sink is arranged in the pit.

Preferably, the pit of the side wall of the backplane is a through hole arranged in the side wall of the backplane. The through hole is easy to process, and has functions of positioning and limiting functions.

Preferably, the backlight module comprises a rubber frame and an outer frame; the side wall of the rubber frame is also provided with a through hole, and the heat sink is arranged on the outer frame. The outer frame can be used for dissipating heat, to reduce the heat dissipation path.

Preferably, the outer frame is provided with opening(s) which is used for receiving the heat sink to enable the heat sink to be in contact with the outside air, and the heat sink is inserted in the opening. Therefore, the outside air is in direct contact with the heat sink, to increase the heat dissipation efficiency of the heat sink.

Preferably, the thickness of the heat sink is more than that of the outer frame. The contact area between the heat sink and air is increased.

Preferably, the outer frame is provided with a lug boss extending to the inside of the backlight module in the position where the heat sink fixed, and the lightbar is fixed on the lug boss. Using the lug boss for positioning can improve the assembling accuracy and efficiency of the backlight module.

Preferably, the heat sink is radiating fins, and the height of the radiating fins is less than or equal to the depth of the lug boss, thus, the radiating fins is positioned in the lug boss, and then the planeness of the peripheral structure of the LCD device is smoothed.

Preferably, the backlight module comprises a backplane and a rubber frame; the pit on the side wall of the backplane is a bending structure arranged on the side wall of the backplane; the side wall of the rubber frame is provided with a through groove, the bending structure is inserted in the through groove, and the heat sink is arranged on the bending structure, thereby adding the A value of the backlight module.

An LCD device comprises the aforementioned backlight module.

A light source of the backlight module comprises an LED chip, and a heat sink; the LED chip and a circuit thereof are directly arranged on the heat sink.

In the invention, because the LED chip of the backlight module and the circuit thereof are directly arranged on the heat sink, the heat emitted by the LED chip can be conducted out through the heat sink with good heat dissipation effect; the heat dissipation efficiency of the heat sink is superior to that of the frequently-used PCB; thus, the phenomenon that heat is excessively accumulated in the area where the light source of the backlight module is arranged is avoided, and then the damage to the LED chip because heat is accumulated for a long time is avoided; meanwhile, because heat is dissipated in time, the inside temperature of the backlight module is reduced, and the heat dissipation efficiency of the backlight module is increased.

In addition, for the ordinary backlight module, such as for the backlight module of which the lightbar is arranged on the aluminum extrusion, the aluminum extrusion can be replaced by the heat sink, and the thickness of the PCB can be reduced by the lightbar, being beneficial to the addition of the A value of the backlight module.

Figure 1:
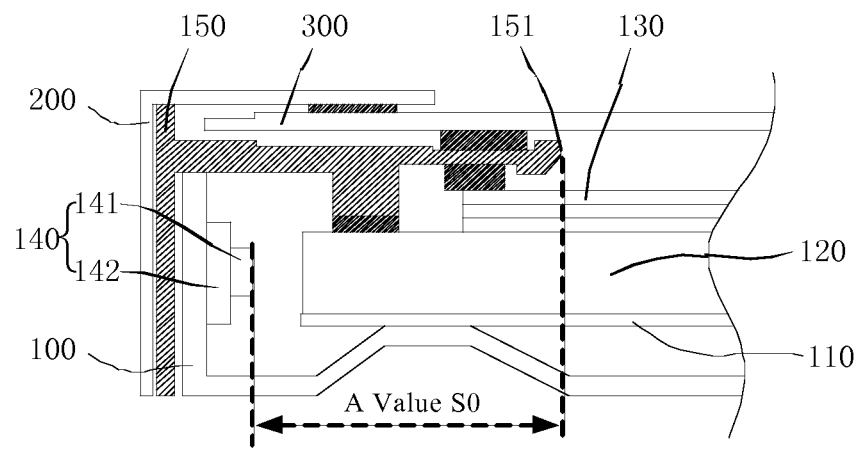
FIG. 1 is a simplified structure diagram of one conventional backlight module.
Figure 2:
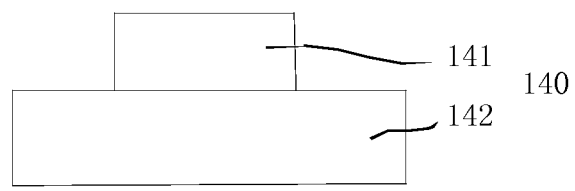
FIG. 2 is a simplified structure diagram of a lightbar of a conventional backlight module.
Figure 3:
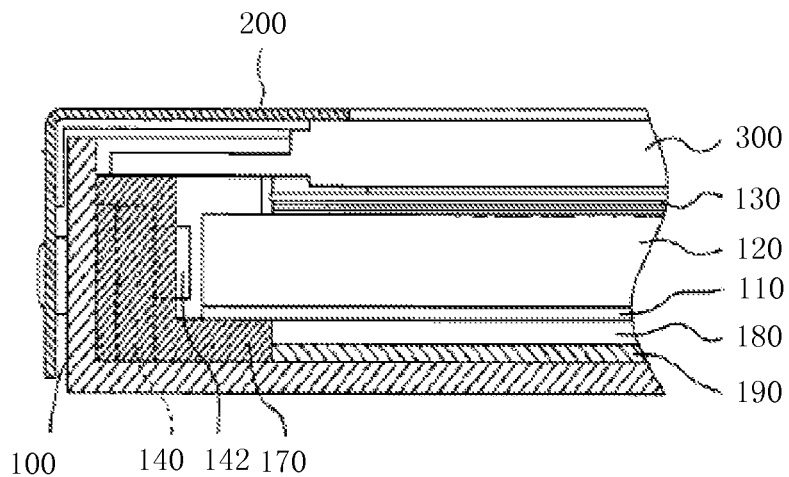
FIG. 3 is a simplified structure diagram of another conventional backlight module.

Legends: 100. backplane; 101. bending structure; 110. Reflecting plate; 120. LGP; 130. optical film; 140. lightbar; 150. rubber frame; 170. support piece; 180. air cavity; 190. heat conducting plate; 141. LED; 142. PCB; 144. radiating fin; 145. LED chip; 1441. substrate; 1442. fin; 151. inner edge; 210. lug boss.

DETAILED DESCRIPTION

The invention will further be described in detail in accordance with the figures and the preferred examples.

FIGS. 5-8 show a backlight module of an LCD device of the invention, comprising a backplane 100, a reflecting plate 110 arranged on the backplane 100, an LGP 120 which is arranged on the reflecting plate 110 and opposite to the lightbar 140, and a rubber frame 150 and an outer frame 200 which are arranged outside the backplane 100 and used for pressing the LGP 120; optical film(s) 130 is arranged on the light emitting surface of the LGP 120, and an LCD panel 300 is fixed above the backlight module by components comprising the rubber frame 150, the outer frame 200 and the like; the lightbar 140 is arranged on one side of the light incident surface of the LGP 120; the lightbar 140 comprises an LED chip 145 and a heat sink 144; the LED chip 145 and the circuit thereof are directly arranged on the heat sink 144.

A light source is used as a light emitting source of the backlight module, and the light source of the invention is further described in accordance with a preferred example.

EXAMPLE 1

Figure 4:
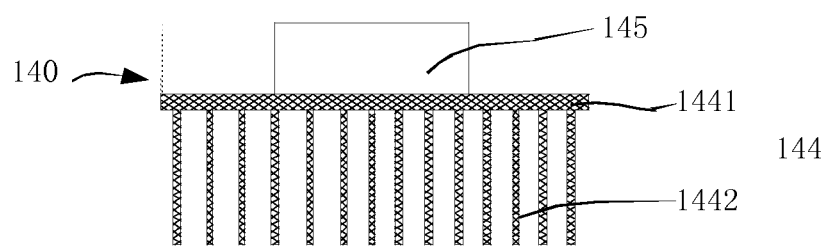
FIG. 4 is a simplified structure diagram of a lightbar of a first example of the invention.

FIG. 4 shows a lightbar 140 of the backlight module of a first example of the invention. The lightbar 140 comprises an LED chip 145, and a heat sink 144; the heat sink 144 comprises a substrate 1441, and radiating fins 1442 arranged on the back side of the substrate 1441; the LED chip 145 is welded on the substrate 1441, and the circuit is arranged on the substrate 1441 by etching. The substrate 1441 is made of metal material with good heat dissipation effect, such as aluminum material, copper material, etc.; the surface for arranging the circuit is coated with an insulating layer to avoid the short circuit of the circuit, and the insulating layer is a heat-conducting insulating layer with good dissipation effect. Thus, the heat of the lightbar 140 can be conducted to the corresponding parts, such as the aluminum extrusion, the backplane, through the heat sink 144 in time, the temperature of the lightbar 140 is reduced by conducting out the heat emitted by the LED chip 145 of the lightbar 140 in time, and then the temperature of the backlight module is reduced.

For the metal substrate, the circuit of the lightbar 140 is directly etched on the substrate 1441 of the heat sink 144, and the substrate 1441 is provided with an insulating layer for avoiding the short circuit of the circuit. The LED chip 145 is directly welded on the substrate 1441 without being packaged, thereby saving packaging materials and omitting packaging process. The heat sink 144 adds the heat dissipation area of the lightbar 140, and further increases the heat dissipation efficiency of the lightbar 140. The heat sink 144 is made of metal material with good heat dissipation effect such as copper material, aluminum material, etc.

The following examples are several preferred examples of the backlight module of the LCD device of the invention.

EXAMPLE 2

Figure 5:
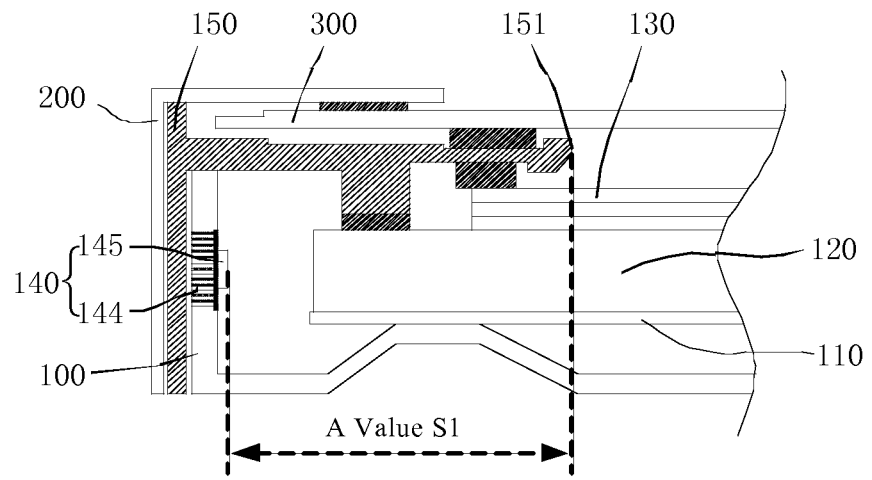
FIG. 5 is a simplified structure diagram of a backlight module of a second example of the invention.

FIG. 5 shows a second example of the invention. As shown in the Figure, the backlight module of the LCD device comprises a backplane 100, a reflecting plate 110 arranged on the backplane 100, an LGP 120 which is arranged on the reflecting plate 110 and opposite to a lightbar 140, and a rubber frame 150 and an outer frame 200 which are arranged outside the backplane 100 and used for pressing the LGP 120; optical film(s) 130 is arranged on the light emitting surface of the LGP 120, and an LCD panel 300 is fixed above the backlight module by components comprising the rubber frame 150, the outer frame 200 and the like; the lightbar 140 is arranged on the backplane 100, and the lightbar 140 is the light source of the first example. As shown in FIG. 5, the side wall of the backplane 100 is provided with insert hole(s), the lightbar 140 is arranged on the backplane 100, and the heat sink 144 is inserted in the insert hole. The inset hole can be an opening in size equivalent to that of the heat sink 144; thus, the heat sink 144 with good heat dissipation effect can directly conduct heat to the backplane, so that the heat dissipation efficiency of the backlight module is increased. The insert hole can be multiple gate-shaped notches which are arranged and respectively correspond to each radiating fin of the lightbar 140, namely each radiating fin is correspondingly inserted in the corresponding notch to be closely attached to the backplane 100; thus, the heat conductivity between the heat sink 144 and the backplane 100 will be better, thereby facilitating the heat sink 144 to conduct the heat emitted by the LED chip 145 to the backplane 100 in time, and increasing the heat dissipation efficiency by dissipating heat by the backplane 100.

Figure 9:
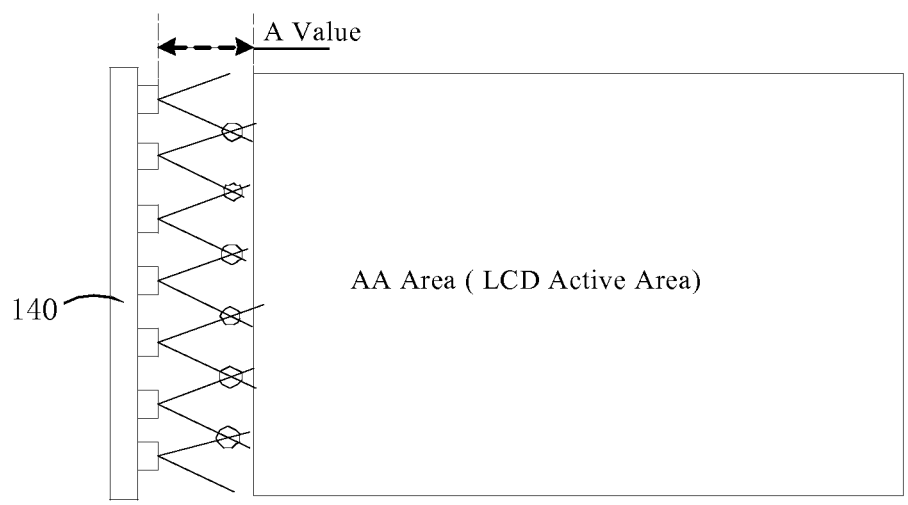
FIG. 9 is a schematic diagram of an A value of an example of the invention.

In addition, because the heat sink 144 is inserted in the insert hole of the side wall of the backplane 100, the A value is added (the A value is the distance between the LED to the active area (AA area) of the LCD device, i.e. the distance between the LED 141 and the inner edge 151 of the rubber frame 150 shown in FIG. 1), the phenomenon of hotspot generated by reducing the A value because of narrow frames is avoided. The phenomenon that light emitted by the LED light source is emitted at a certain angle, dark zones are formed in the areas that light cannot shine between every two LEDs, the light and dark zones (one light one dark) are alternatively arranged from top to bottom is called hotspot. As show FIG. 5, the A value Si of the backlight module of the second example is added about S1=S1−S0=d2+d11 relative to the A value S0 of the conventional backlight module shown in FIG. 1, wherein, d2 is the thickness of the PCB, and d11 is the thickness of the LED package. Similarly, in this case, as shown in FIG. 9, dark zones formed between every two LED chips of the lightbar 140 occur outside the active area (AA area) of LCD device, thereby increasing the optical quality of the backlight module and the display effect of the LCD device.

In the example, the radiating fins may comprise plate-shaped heat sink(s) with good heat dissipation effect, i.e. the plate-shaped heat sink may be not provided with radiating fins, and the plate-shaped heat sink with good heat dissipation effect is only used for replacing the PCB to increase heat dissipation efficiency.

In the example, heat is conducted to the backplane 100 through the heat sink 144, and the heat dissipation effect is achieved by the heat exchange between the backplane 100 and the outside air. Therefore, the backplane 100 of the invention is preferably made of aluminum material, copper material or other material with good heat dissipation effect.

EXAMPLE 3

Figure 6:
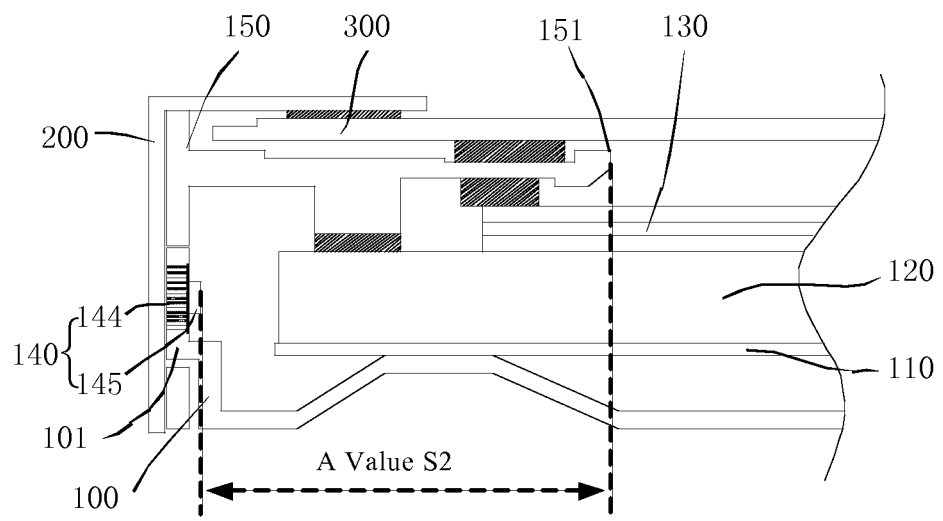
FIG. 6 is a simplified structure diagram of a backlight module of a third example of the invention.

FIG. 6 shows a third example of the invention. In the example, the rubber frame 150 is provided with a through groove in the position corresponding to the lightbar 140, the backplane 100 is provided with a bending structure 101 in the position to form a pit, the bending structure 101 is inserted in the through groove of the rubber frame 150, and the lightbar 140 is directly arranged on the bending structure 101 of the backplane 100. Similarly, the bending structure 101 is provided with an insert hole for arranging the lightbar 140, and the heat sink 144 of the lightbar 140 is inserted in the insert hole. Thus, the distance between the lightbar 140 and the inner edge 151 of the rubber frame 150 is increased, and then the A value is added; therefore, hotspot is prevented from generating in the active area (AA area) of the LCD device. As shown in FIG. 6, the A value S2 of the backlight module of the third example is added about S2=S2−S0=d3+d2+d11 relative to the A value S0 of the conventional backlight module shown in FIG. 1, wherein, d3 is the thickness of the backplane, d2 is the thickness of the PCB, and d11 is the thickness of the LED package. Similarly, in this case, as shown in FIG. 9, dark zones formed between every two LED chips of the lightbar 140 occur outside the active area (AA area) of the LCD device, thereby increasing the optical quality of the backlight module and the display effect of the LCD device.

In the example, because the lightbar 140 is arranged on the backplane 100, the backplane 100 can be made of aluminum material or other material with good heat dissipation effect to increase the heat dissipation efficiency of the backlight module; because of being in direct contact with the backplane 100, the outer frame 200 can be made of material with good heat dissipation effect, such as aluminum material, to add the heat dissipation path of the backlight module and increase the heat dissipation efficiency of the backlight module.

EXAMPLE 4

Figure 7:
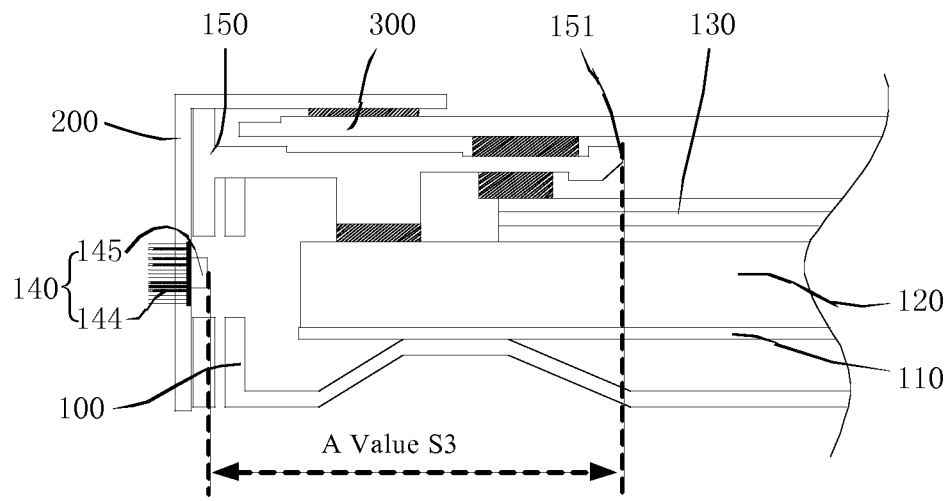
FIG. 7 is a simplified structural diagram of a fourth example of the invention.

FIG. 7 shows a fourth example of the invention. As shown in the Figure, the fourth example is different from the third example in that: the lightbar 140 is arranged on the outer frame 200; both the side wall of the backplane 100 and the side wall of the rubber frame 150 are respectively provided with through holes to form pits, so that the lightbar 140 can be arranged on the outer frame 200; the outer frame 200 is provided with opening(s) which is used for receiving the lightbar 140 to enable the fins of the heat sink 144 to be in contact with the outside air, the heat sink 144 of the lightbar 140 is inserted in the opening, and the fins are extended outside the outer frame to be in contact with air in large area as far as possible so as to increase the heat dissipation efficiency. The opening can be a hole in size equivalent to that of the heat sink 144; thus, the heat sink 144 with good heat dissipation effect can be in contact with air in large area, to increase the heat dissipation efficiency; the opening can also be multiple gate-shaped notches which are arranged and respectively correspond to each fin of the heat sink 144, namely each radiating fin is correspondingly inserted in the corresponding notch to be closely attached to the outer frame 200. In this case, preferably, the outer frame 200 is made of material with good heat dissipation effect; thus, the heat conductivity between the radiating fins and the outer frame 200 will be better, thereby facilitating the heat sink 144 to conduct the heat emitted by the LED chip 145 to the outer frame 200 in time, and increasing the heat dissipation efficiency through auxiliarily dissipating heat by the outer frame 200. In addition, because the heat sink 144 is inserted in the opening of the outer frame 200, the A value of the backlight module is added. As shown in FIG. 7, the A value S3 of the backlight module of the fourth example is added about S5=S5−S0=d3+d4+d11 relative to the A value S0 of the conventional backlight module shown in FIG. 1. Similarly, in this case, as shown in FIG. 9, dark zones formed between every two LEDs of the lightbar 140 occur outside the active area (AA area) of the LCD device, thereby increasing the optical quality of the backlight module and the display effect of the LCD device.

In the example, the height of the fin of the heat sink 144 should be more than the thickness of the outer frame 200, namely the fin of the heat sink 144 should be extended outside the outer frame 200 to be in direct contact with air, so as to increase the heat dissipation efficiency.

In the example, the outer frame 200 is in direct contact with the heat sink 144, and the outer frame 200 can be made of material with good heat dissipation effect such as aluminum material to add the heat dissipation path and increase the heat dissipation efficiency.

EXAMPLE 5

Figure 8:
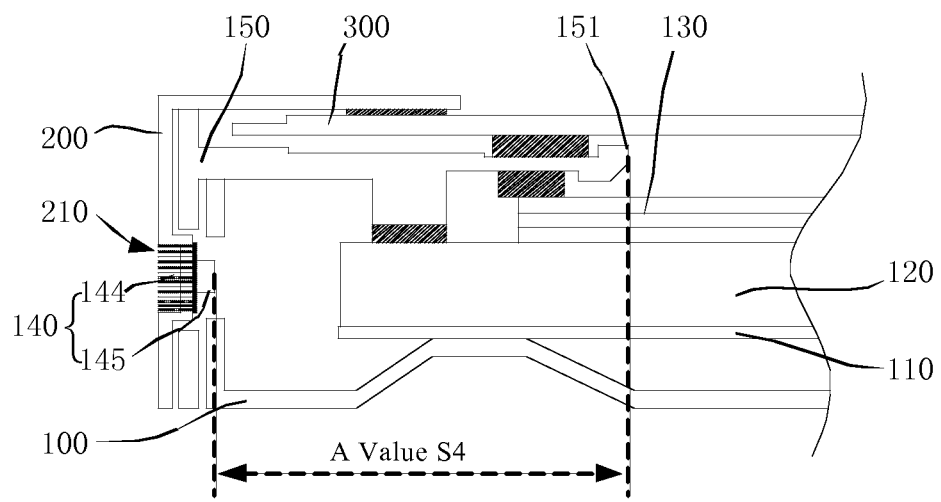
FIG. 8 is a simplified structural diagram of a backlight module of a fifth example of the invention.

FIG. 8 shows a fifth example of the invention, and the fifth example is different from the fourth example in that: as shown in FIG. 8, in this example, the outer frame 200 is provided with a lug boss 210 extending to the inside of the backlight module in the position corresponding to the lightbar 140. The lug boss 210 corresponds to the pit formed by the through holes of the backplane 100 and the rubber frame 150. The aim is to facilitate positioning when assembling the backlight module, and increase the assembling accuracy and efficiency. The height of the fins of the heat sink 144 extending outside the outer frame is set to be equal to or less than the depth of the lug boss 210; thus, the fin(s) of the heat sink 144 is fully inserted in the lug boss 210, the heat sink 144 is guaranteed to be in contact with air in large area, and the fins are prevented from protruding from both sides of the outer frame 200 to affect the planeness of the outer frame of the LCD device. In addition, the depth of the lug boss 210 is less than the total thickness of the side wall of the backplane 100 and the side wall of the rubber frame 150. In the example, the depth of the lug boss 210 is set as required; thus, the A value of the backlight module is added about S4=S4−S0=d11+d2. Therefore, the hotspot of the LCD device can be eliminated, and the display effect of the LCD device can be increased.

The invention is described in detail in accordance with the above contents with the specific preferred examples. However, this invention is not limited to the specific examples. For example, if it is not necessary to consider the problems such as manufacture difficulty, etc., the LED chip and the circuit can be directly arranged in the corresponding position of the backplane, to obtain good heat dissipation effect. For the ordinary technical personnel of the technical field of the invention, on the premise of keeping the conception of the invention, the technical personnel can also make simple deductions or replacements, and all of which should be considered to belong to the protection scope of the invention.

We claim:

1. A backlight module, comprising: a backplane, a rubber frame, an outer frame, an LED chip, and a heat sink; wherein said LED chip and a circuit thereof are directly arranged on said heat sink, a side wall of said backplane provides a pit extending to the outside of said backlight module relative to a light incident surface of an LGP, and said heat sink is arranged in said pit, and a side wall of said rubber frame provides a through hole corresponding to the pit, and said heat sink is arranged on said outer frame through the through hole and the pit.

2. The backlight module of claim 1, wherein said heat sink is made of metal material, a surface of said heat sink is coated with an insulating layer, and said circuit is arranged on said insulating layer.

3. The backlight module of claim 2, wherein said insulating layer is made of material with good heat conductivity.

4. The backlight module of claim 1, wherein said LED chip is directly welded on said heat sink, and said LED chip is not externally provided with a package.

5. The backlight module of claim 1, wherein said heat sink comprises a substrate, and radiating fins arranged on said substrate; said LED chip and the circuit thereof are arranged on the substrate of said radiating fins.

6. The backlight module of claim 5, wherein said backlight module comprises a backplane; the side wall of said backplane is provided with an insert hole, and said radiating fins are inserted in said insert hole.

7. The backlight module of claim 1, wherein the pit is a through hole arranged in the side wall of said backplane.

8. The backlight module of claim 1, wherein said outer frame is provided with an opening which is used for receiving said heat sink to enable said heat sink to be in contact with the outside air, and said heat sink is inserted in said opening.

9. The backlight module of claim 8, wherein the thickness of said heat sink is more than that of said outer frame.

10. The backlight module of claim 9, wherein said outer frame is provided with a lug boss extending to the inside of said backlight module in the position corresponding to said heat sink, and said heat sink is fixed on said lug boss.

11. The backlight module of claim 10, said heat sink is radiating fins, and the height of said radiating fins is less than or equal to the depth of said lug boss.

12. An LCD device, comprising: a backplane, a rubber frame, an outer frame, an LED chip, and a heat sink; wherein said LED chip and a circuit thereof are directly arranged on said heat sink, a side wall of said backplane provides a through hole, a side wall of said rubber frame provides a through hole corresponding to the through hole of said backplane, and said heat sink is arranged on said outer frame through the through hole of said rubber frame and the through hole of said backplane.

13. The LCD device of claim 12, wherein said heat sink is made of metal material, a surface of said heat sink is coated with an insulating layer, and said circuit is arranged on said insulating layer.

14. The LCD device of claim 12, wherein said LED chip is directly welded on said heat sink, and said LED chip is not externally provided with a package.

15. The LCD device of claim 12, wherein said heat sink comprises a substrate, and radiating fins arranged on said substrate; said LED chip and said circuit thereof are arranged the substrate of said radiating fins; said backlight module comprises a backplane; the side wall of said backplane is provided with an insert hole, and said radiating fins are inserted in said insert hole.

16. The LCD device of claim 12, wherein said backlight module comprises said outer frame is provided with an opening which is used for receiving said heat sink to enable said heat sink to be in contact with the outside air, said heat sink is inserted in said opening, and the thickness of said heat sink is more than that of said outer frame; said outer frame is provided with a lug boss extending to the inside of said backlight module in the position corresponding to said heat sink, and said heat sink is fixed on said lug boss.

17. A backlight module, comprising: a backplane, a rubber frame, an outer frame, an LED chip, and a heat sink; wherein said LED chip and a circuit thereof are directly arranged on said heat sink, a side wall of said backplane provides a pit extending to the outside of said backlight module relative to a light incident surface of an LGP , and said heat sink is arranged in said pit, and the pit is a bending structure arranged on the side wall of said backplane; a side wall of said rubber frame provides a through groove, said bending structure is inserted in said through groove, and said heat sink is arranged on said bending structure.

* * * * *